(12) United States Patent
Curt et al.

(10) Patent No.: US 11,443,625 B2
(45) Date of Patent: Sep. 13, 2022

(54) METHOD AND APPARATUS FOR A CLOUD-BASED TRAFFIC MONITORING SYSTEM

(71) Applicant: Power Monitors, Inc., Mt. Crawford, VA (US)

(72) Inventors: Walter Morgan Curt, Mt. Crawford, VA (US); Christopher Fisher Mullins, Mt. Crawford, VA (US)

(73) Assignee: POWER MONITORS, INC., Mt. Crawford, VA (US)

( * ) Notice: Subject to any disclaimer, the term of this patent is extended or adjusted under 35 U.S.C. 154(b) by 0 days.

(21) Appl. No.: 16/377,820

(22) Filed: Apr. 8, 2019

(65) Prior Publication Data

US 2019/0311620 A1    Oct. 10, 2019

Related U.S. Application Data

(60) Provisional application No. 62/655,195, filed on Apr. 9, 2018.

(51) Int. Cl.
| | | |
|---|---|---|
| *G08G 1/097* | (2006.01) | |
| *G08G 1/095* | (2006.01) | |
| *G08B 21/18* | (2006.01) | |
| *H04L 67/125* | (2022.01) | |

(52) U.S. Cl.
CPC .......... *G08G 1/097* (2013.01); *G08B 21/185* (2013.01); *G08G 1/095* (2013.01); *H04L 67/125* (2013.01)

(58) Field of Classification Search
CPC ...... G08G 1/097; G08G 1/095; G08B 21/185; H04L 67/125

USPC .......................... 340/539.1, 539.11, 901–905
See application file for complete search history.

(56) References Cited

U.S. PATENT DOCUMENTS

| | | | |
|---|---|---|---|
| 9,483,948 B1 * | 11/2016 | Gordon | G01S 13/931 |
| 2005/0027436 A1 * | 2/2005 | Yoshikawa | G01C 21/3617 |
| | | | 701/117 |
| 2012/0143383 A1 * | 6/2012 | Cooperrider | H02J 13/0079 |
| | | | 700/295 |
| 2012/0242507 A1 * | 9/2012 | Nguyen | H05B 45/58 |
| | | | 340/907 |
| 2013/0063282 A1 * | 3/2013 | Baldwin | B61L 29/282 |
| | | | 340/941 |
| 2013/0120138 A1 * | 5/2013 | Hicks, III | G08B 25/08 |
| | | | 340/538 |
| 2014/0210645 A1 * | 7/2014 | Sharma | G08G 1/07 |
| | | | 340/907 |
| 2014/0350830 A1 * | 11/2014 | David | G08G 1/0145 |
| | | | 701/117 |
| 2016/0351048 A1 * | 12/2016 | Thompson | G08G 1/04 |
| 2017/0132915 A1 * | 5/2017 | Cross | G08G 1/005 |

FOREIGN PATENT DOCUMENTS

KR    101532420 B1 *    6/2015

* cited by examiner

*Primary Examiner* — Daryl C Pope
(74) *Attorney, Agent, or Firm* — BakerHostetler

(57) ABSTRACT

A system is configured to provide an interface between a user and a traffic control system. The system includes a server configured to receive over a network data, information, and/or a status from the traffic control system. The server further configured to analyze the data, information, and/or status from the traffic control system. The server further configured to transmit over a network to a user device analysis of the data, information, and/or status from the traffic control system.

17 Claims, 9 Drawing Sheets

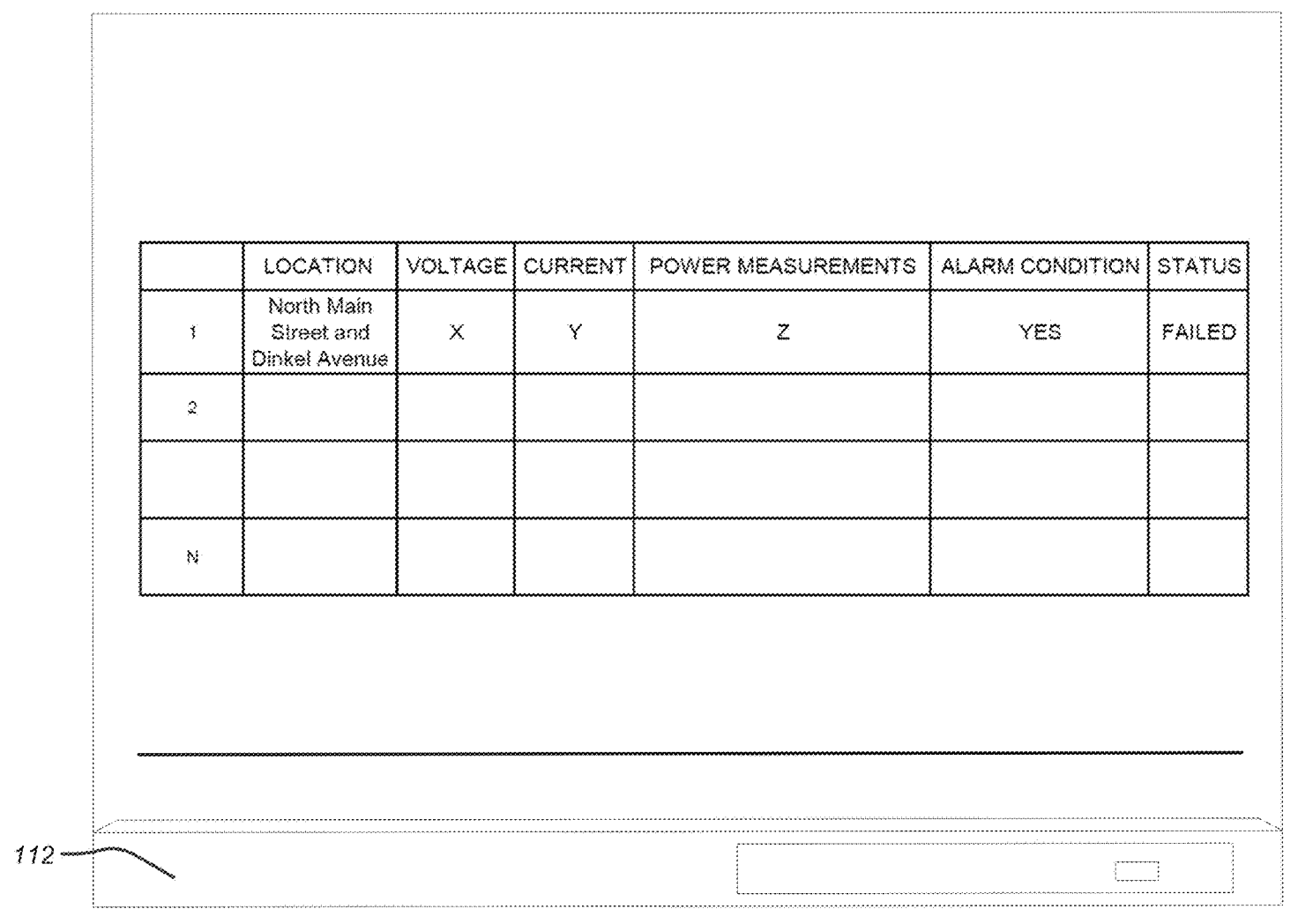

| | LOCATION | VOLTAGE | CURRENT | POWER MEASUREMENTS | ALARM CONDITION | STATUS |
|---|---|---|---|---|---|---|
| 1 | North Main Street and Dinkel Avenue | X | Y | Z | YES | FAILED |
| 2 | | | | | | |
| N | | | | | | |

Figure 8

METHOD AND APPARATUS FOR A CLOUD-BASED TRAFFIC MONITORING SYSTEM

CROSS-REFERENCE TO RELATED APPLICATIONS

This application claims the benefit from U.S. Provisional Application No. 62/655,195 filed on Apr. 9, 2018, which is hereby incorporated by reference in its entirety for all purposes as if fully set forth herein.

FIELD OF THE DISCLOSURE

The disclosure relates to method for a cloud-based traffic monitoring system. The disclosure further relates to an apparatus for a cloud-based traffic monitoring system.

BACKGROUND OF THE DISCLOSURE

Traffic signaling systems are migrating from relay-based devices (NEMA TS-1 and TS-2 generations) to microprocessor based solid state control systems (Advanced Traffic Control (ATC) generation). While greatly expanding the capability for traffic control, ATC systems are often much more sensitive to incoming AC power issues, and are also prone to more complex failure modes. In addition, the ATC devices often include a communications port (e.g., Ethernet), but no method or infrastructure to remotely connect to this port. Local access involves travelling on site and opening a cabinet.

Accordingly, it would be beneficial for ATC systems to implement a system-wide AC power monitoring, traffic control status monitoring, communications access to the controller, and the like to improve reliability, maintenance operations, and the like.

SUMMARY OF THE DISCLOSURE

The foregoing needs are met, to a great extent, by the disclosure, wherein in one aspect a method and apparatus for a cloud-based traffic monitoring system is provided.

Aspects herein provide solutions for providing accurate and timely datapoints concerning traffic controller power input, signal operation, and the like. Monitoring AC power provides important information regarding utility voltage feed and (Uninterruptable Power Supply (UPS) output.

Monitoring the traffic controller current consumption indirectly provides detailed information on light signal status, traffic mode, and the like. Detection of failed lamps or LED assemblies in a light signal allow for immediate notification and timely repair. The monitoring system disclosed here provides this ability.

Aspects herein further disclose a centralized, cloud-based system for receiving, storing, and analyzing this data, and sending real-time alerts (including but not limited to, e.g., e-mail, SMS, and the like) based on specific conditions, to improve the state of the art in traffic signaling maintenance and operation. Such aspects are not conventional in the art, which instead relies on local access for ATC devices and/or reliance on legacy relay-based devices.

According to one aspect, a system is configured to provide an interface between a user and a traffic control system and the system includes a server configured to receive over a network at least one of the following: data from the traffic control system, information from the traffic control system, and a status from the traffic control system; the server further configured to analyze at least one of the following: the data from the traffic control system, the information from the traffic control system, and the status from the traffic control system; and the server further configured to transmit over a network to a user device analysis of at least one of the following: the data from the traffic control system, the information from the traffic control system, and the status from the traffic control system.

According to another aspect, a process to provide an interface between a user and a traffic control system includes receiving over a network with a server at least one of the following: data from the traffic control system, information from the traffic control system, and a status from the traffic control system; analyzing with the server at least one of the following: the data from the traffic control system, the information from the traffic control system, and the status from the traffic control system; and transmitting with the server over a network to a user device analysis of at least one of the following: the data from the traffic control system, the information from the traffic control system, and the status from the traffic control system.

According to another aspect, a computer program product embodying instructions to implement a process to provide an interface between a user and a traffic control system when executed on a server, the instructions include receiving over a network with a server at least one of the following: data from the traffic control system, information from the traffic control system, and a status from the traffic control system; analyzing with the server at least one of the following: the data from the traffic control system, the information from the traffic control system, and the status from the traffic control system; and transmitting with the server over a network to a user device analysis of at least one of the following: the data from the traffic control system, the information from the traffic control system, and the status from the traffic control system.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

FIG. 8 illustrates an exemplary display according to an aspect of the disclosure.

DETAILED DESCRIPTION

Figure 1:
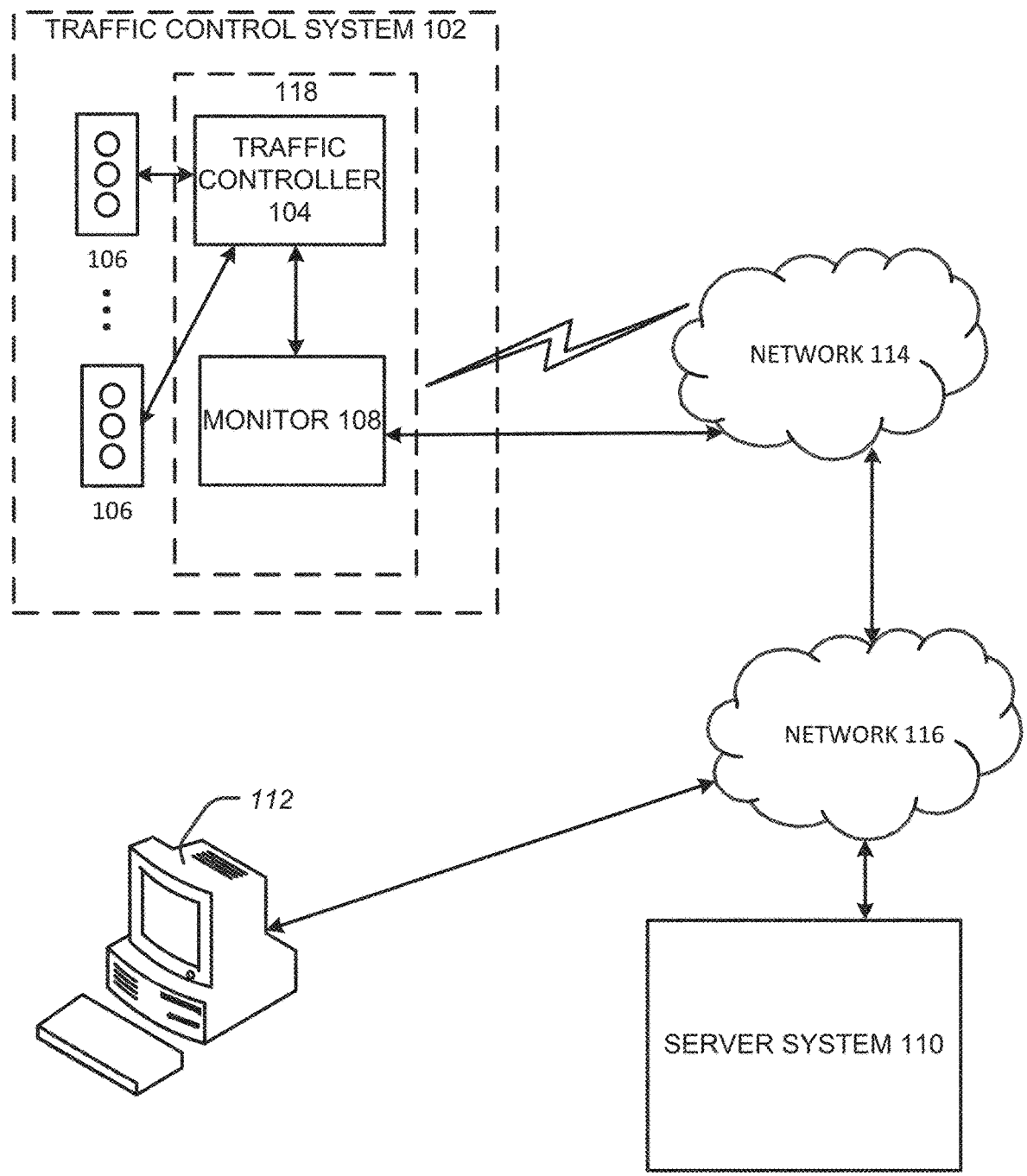
FIG. 1 illustrates a cloud-based traffic monitoring system according to an aspect of the disclosure.

The disclosure will now be described with reference to the drawing figures, in which like reference numerals refer to like parts throughout. Aspects of the disclosure advantageously provide a method and apparatus for a cloud-based traffic monitoring system.

FIG. 1 illustrates a cloud-based traffic monitoring system according to an aspect of the disclosure.

In particular, FIG. 1 illustrates a traffic control system 102 having a traffic controller (ATC) 104 and signals 106. FIG. 1 further illustrates a monitor 108 and a server system 110 providing a web-based interface to a user device 112. In various aspects, the monitor 108 may be shared among multiple traffic controllers 104. In alternative or complementary aspects, each traffic controller (ATC) 104 may utilize a dedicated monitor 108.

As further illustrated in FIG. 1, the monitor 108 may connect to a network 114. In one aspect, the network 114 may be a wireless network and the monitor 108 may connect to the network 114 utilizing mobile broadband or wireless Internet access delivered through mobile phone towers over a communication channel as defined herein. In one aspect, the network 114 may be a satellite network and the monitor 108 may connect to the network 114 utilizing, for example, a fixed-satellite service (e.g., article 1.21 of the International Telecommunication Union's (ITU) Radio Regulations (RR)). In one aspect, the network 114 may be a microwave communication system and the monitor 108 may connect to the network 114 utilizing the microwave communication system. In one aspect, the network 114 may be a network and the monitor 108 may connect to the network 114 utilizing a communication channel as defined herein. As further illustrated in FIG. 1, the monitor 108 may connect to the network 114 and may be further connected to another network 116, such as the Internet, to connect to the server system 110. In aspects, the server system 110, the monitor 108, the traffic controller 104, the user device 112, and like components may communicate over one or more networks, such as the network 114 and/or the network 116, in order to exchange data, provide information, provide control, provide commands, obtain status, and the like.

The signals 106 may be located over or adjacent an intersection, and the other devices may be connected to the signals 106 and arranged in a nearby cabinet 118. The signals 106 may be implemented as traffic lights, traffic signals, traffic lamps, signal lights, stop lights, pedestrian and cyclist crossing lights, or the like. A typical vertical traffic signal has three aspects, or lights, facing the oncoming traffic, red on top, yellow below, and green below that. Generally, one aspect is illuminated at a time. In some cases, a fourth aspect, for a turn arrow for example, may be utilized in more complicated road traffic intersections.

In one aspect, the cabinet 118 may include rigid walls and a floor to hold the monitor 108, the traffic controller 104, and the like. Various components within the cabinet 118 and the associated connections may be hermetically sealed. The cabinet 118 may further include various waterproofing technologies, insulation, cooling vents, and the like. The cabinet 118 may further include a cover that fully encloses the cabinet 118 and a door to provide access to the interior of the cabinet 118 housing the monitor 108, the traffic controller 104, and the like.

Figure 2:
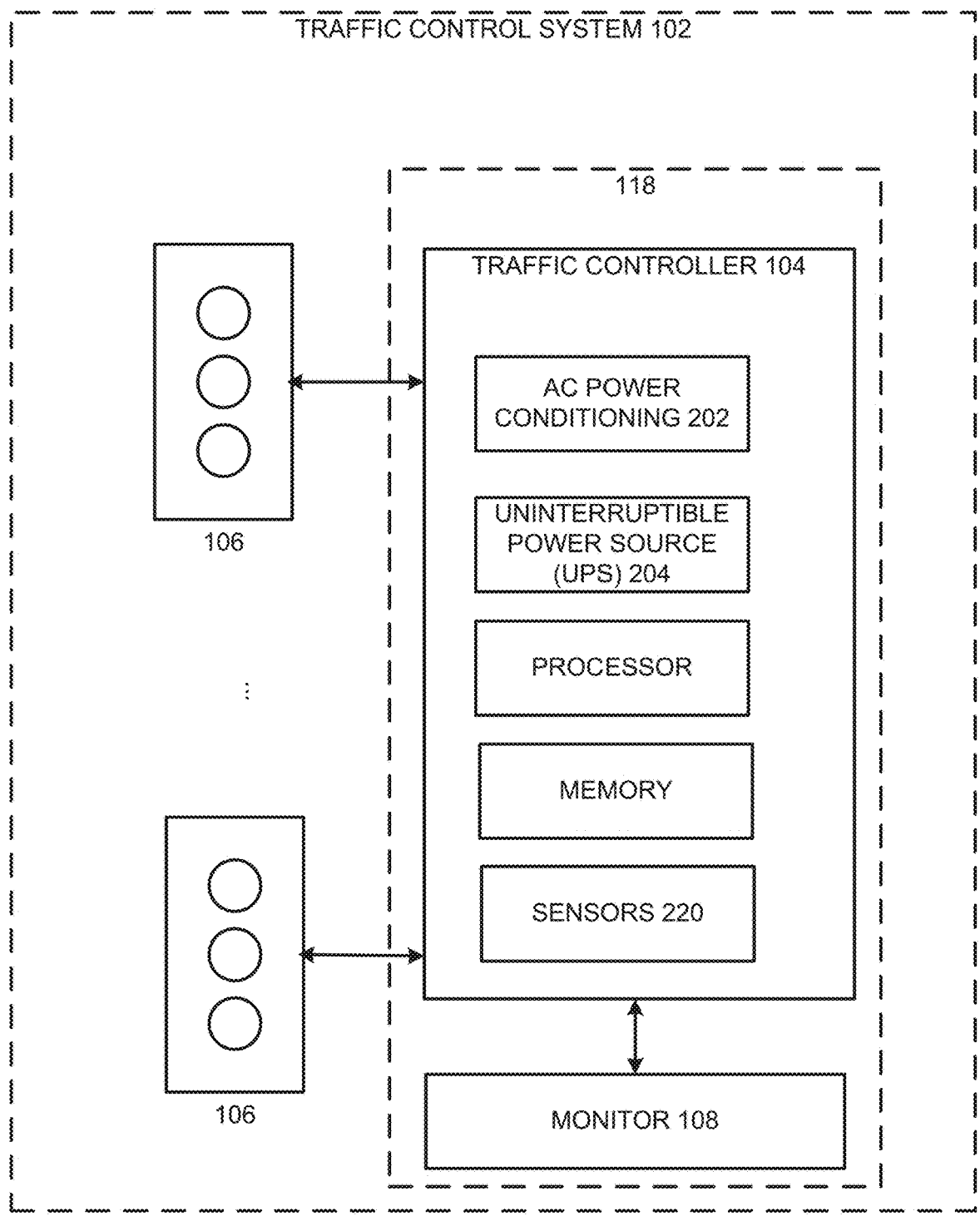
FIG. 2 illustrates a traffic control system according to an aspect of the disclosure.

FIG. 2 illustrates a traffic control system according to an aspect of the disclosure.

The traffic control system 102 and/or the traffic controller (ATC) 104 may control, power, and the like the signals 106. The traffic control system 102 and/or the traffic controller (ATC) 104 may include AC power conditioning devices 202. The AC power conditioning devices 202 may provide surge suppression and the like. The traffic control system 102 and/or the traffic controller (ATC) 104 may include an uninterruptible power source (UPS) 204. The traffic control system 102 may further include the traffic controller (ATC) 104 and the signals 106. The traffic control system 102 and/or the traffic controller (ATC) 104 may include sensors 220, a memory, a processor, and the like. In some situations, the AC power conditioning devices 202 or an uninterruptible power source (UPS) 204 may be absent. Aspects of the disclosure add the monitor 108 to a cabinet 118. Information gathered by the monitor 108 can be provided for analysis or review as described in further detail herein.

Figure 3:
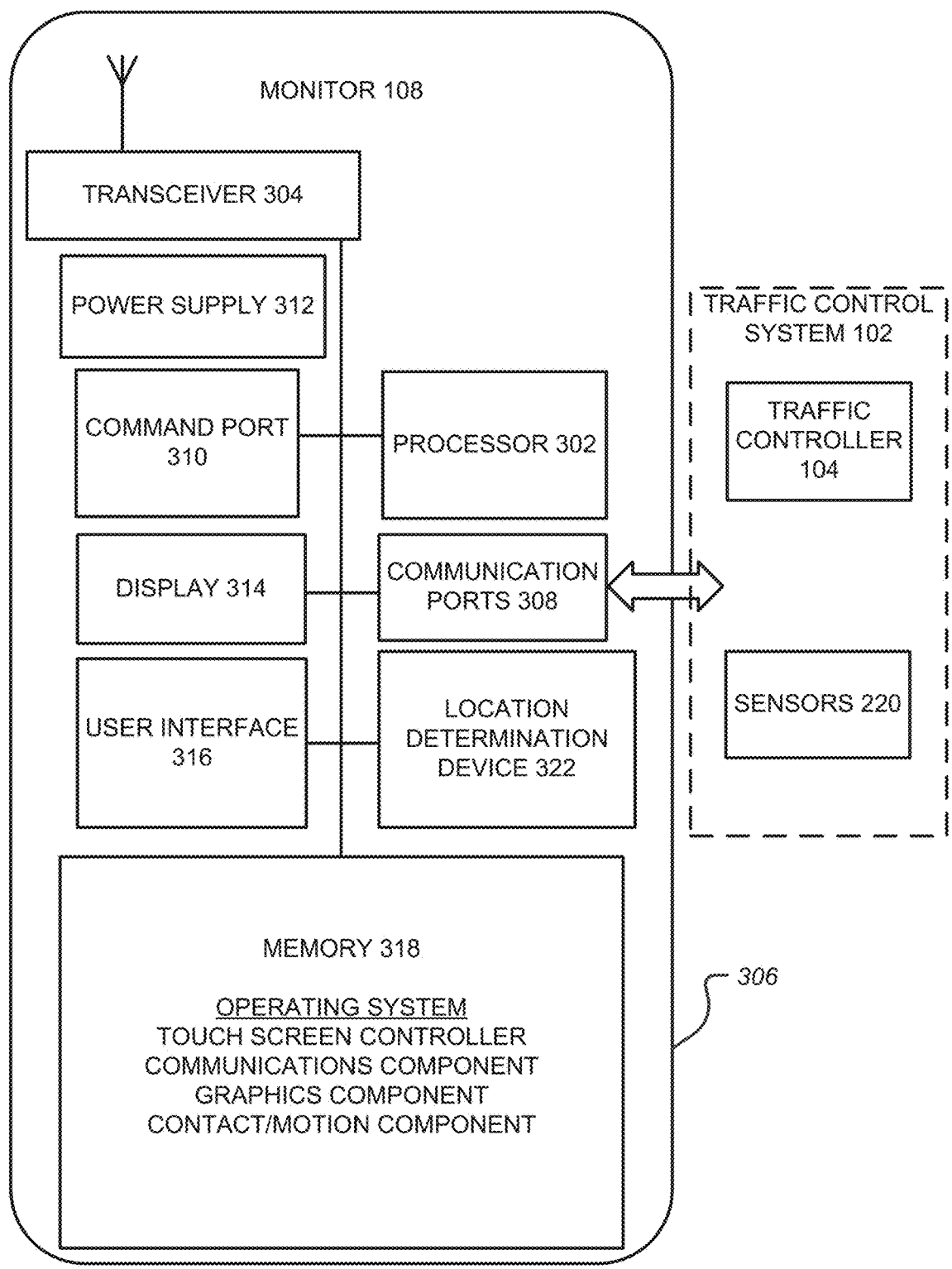
FIG. 3 illustrates a monitor according to an aspect of the disclosure.

FIG. 3 illustrates a monitor according to an aspect of the disclosure.

In one aspect, the monitor 108 may be located within the traffic controller (ATC) 104. In one aspect, the monitor 108 may be located near the traffic controller (ATC) 104. The monitor 108 may be configured for direct measurement of utility single or three-phase voltage, current, power, and the like as delivered to the traffic controller (ATC) 104. In further aspects, the monitor 108 may be configured for monitoring operation of the signals 106.

In one aspect, the monitor 108 may include a processor 302. In one aspect, the processor 302 may be embedded in a housing 306. In one aspect, the processor 302 may be included in the housing 306. In one aspect, the processor 302 may be arranged separate from the housing 306. In one aspect, the monitor 108 may be configured to collect measurements, apply user settable thresholds, respond to external commands, and the like with respect to the signals 106, the traffic controller (ATC) 104, the traffic control system 102, and the like.

In one aspect, the monitor 108 may include a transceiver 304. In one aspect, the transceiver 304 may be implemented as a cellular modem, a satellite modem, a component to operate over a communication channel as defined herein, or the like. In one aspect, the transceiver 304 may be embedded in the housing 306. In one aspect, the transceiver 304 may be included in the housing 306. In one aspect, the transceiver 304 may be arranged separate from the housing 306. In one aspect, the transceiver 304 may be configured to relay data, information, control, and the like to the server system 110.

The housing 306 may further include rigid walls and a floor to hold the monitor 108. Various components within the housing 306 and the associated connections may be hermetically sealed. The housing 360 may further include various waterproofing technologies, insulation, cooling vents, and the like. The housing 360 may further include a cover that fully encloses the housing 306.

In one aspect, the monitor 108 may include communication ports 308. In one aspect, the communication ports 308 may be implemented to utilize RS-485 protocol. In one aspect, the communication ports 308 may be implemented to utilize Ethernet protocol. In one aspect, the communication ports 308 may be implemented to utilize RS-232 protocol. In one aspect, the communication ports 308 may be implemented to utilize a wireless link protocol. In one aspect, the communication ports 308 may be implemented to utilize the communication channel as defined herein.

In one aspect, the communication ports 308 may be embedded in the housing 306. In one aspect, the communication ports 308 may be included in the housing 306. In one aspect, the communication ports 308 may be arranged separately from the housing 306.

In one aspect, the communication ports 308 may be configured to interface with external sensors 220, equipment, and the like. In one aspect, the communication ports 308 may be configured to interface with external sensors 220 and equipment such as the traffic controller (ATC) 104.

In one aspect, the monitor 108 may include a command port 310 for relaying commands to the traffic controller (ATC) 104, the signals 106, or other compatible control devices.

In one aspect, the monitor 108 may be associated with a single intersection's traffic control system 102. The monitor 108 may collect data from all compatible sensors 220, add the built-in voltage/current/power measurements, and/or the like and may package this data for streaming to the server system 110. Additionally, the monitor 108 may apply thresholds to any measured or sensed parameter, and send alerts to the server system 110, and/or may be configured to automatically send commands through the command ports 310. The sensors 220 may include a voltage sensor, a current sensor, a power measurement sensor, a temperature sensor, and the like.

In one aspect, the monitor 108 may include a power supply 312, a display 314, a user interface 316, a memory 318, and the like. The memory 318 may include an operating system, a touchscreen controller, a communication component, a graphics component, a contact/motion component, and the like.

Figure 4:
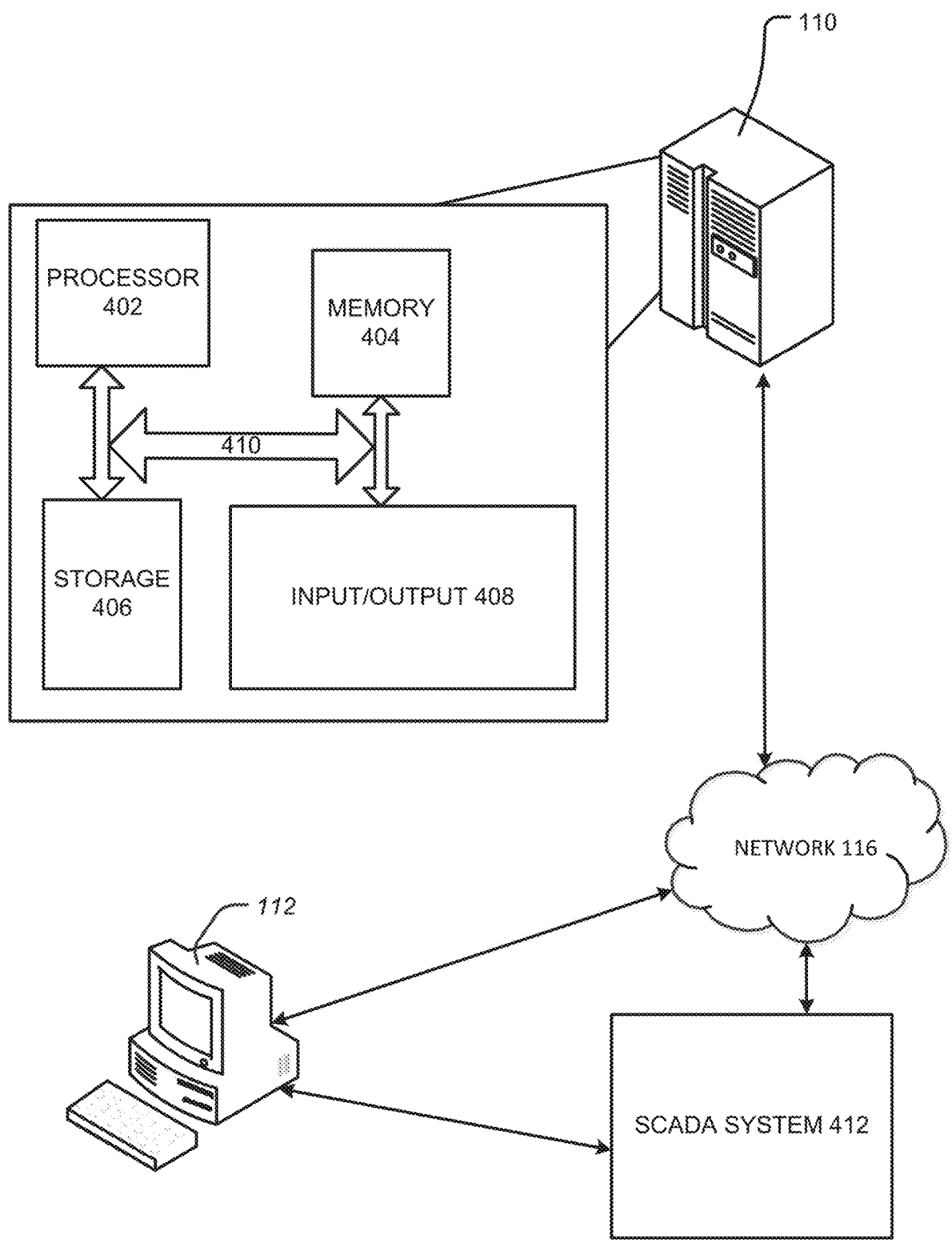
FIG. 4 illustrates a server system according to an aspect of the disclosure.

FIG. 4 illustrates a server system according to an aspect of the disclosure.

Figure 7:
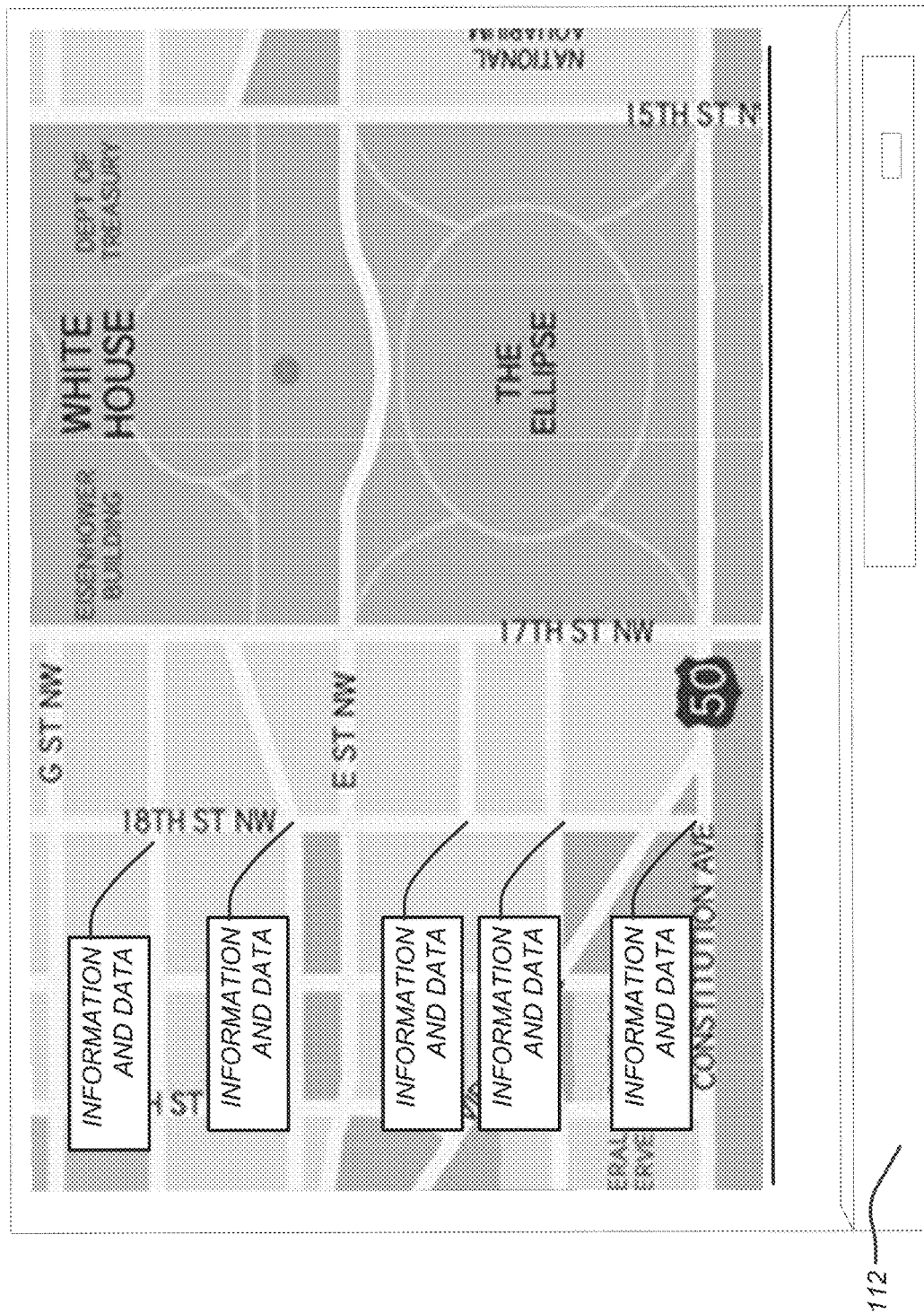
FIG. 7 illustrates an exemplary display according to an aspect of the disclosure.
Figure 9:
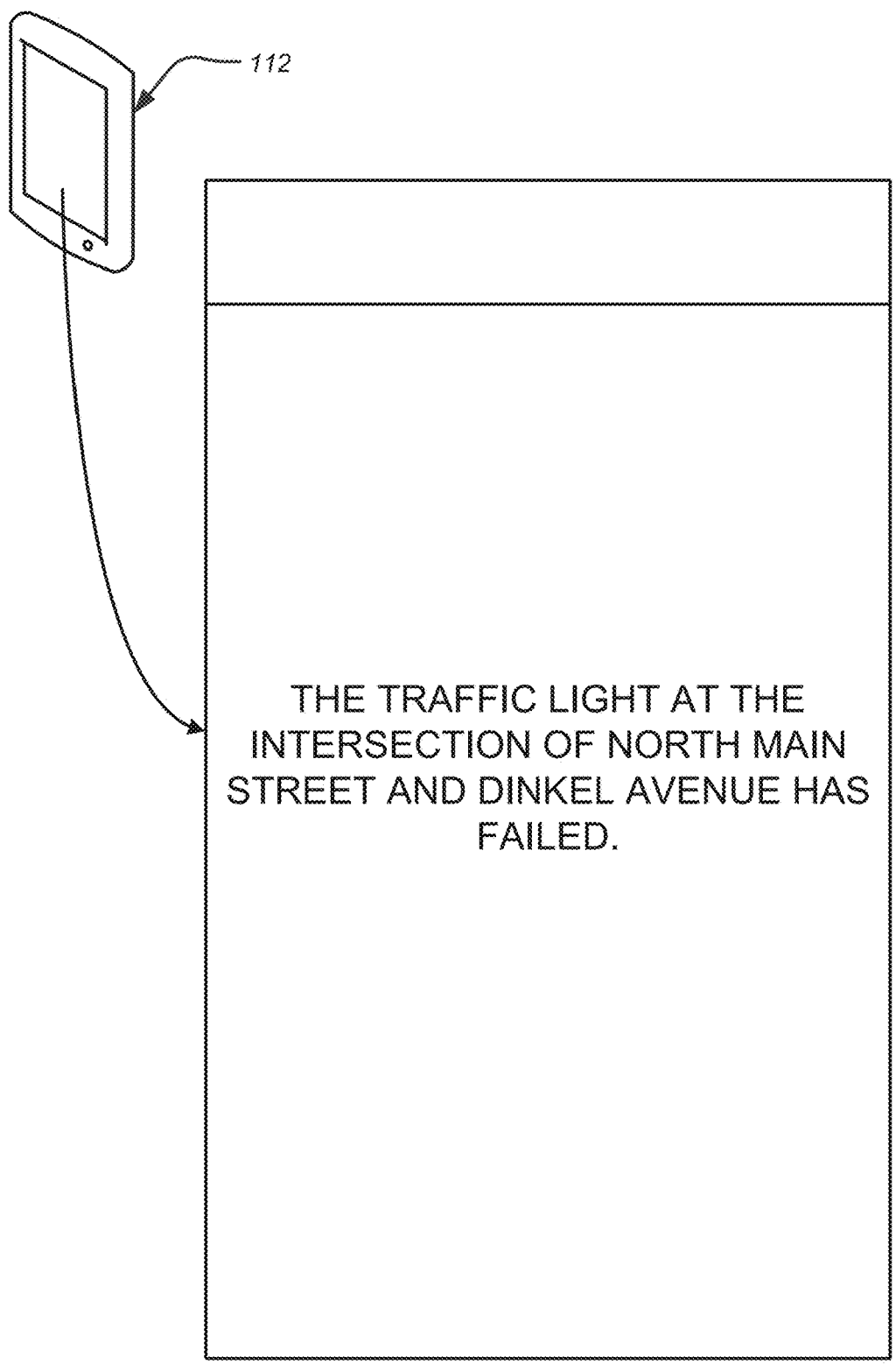
FIG. 9 illustrates an exemplary display according to an aspect of the disclosure.

In particular, FIG. 4 illustrates details of the server system 110. In one aspect, the server system 110 may be a cloud-based server system that may include a collection of virtual machines and processes. The server system 110 may be configured to receive and parse data from all monitors 108 as it streams in. The server system 110 may be configured to store all measured values as sent from the monitors 108. The server system 110 may be configured to process any alerts from the monitors 108, including sending immediate message notices (e.g., email, text message, application messages, and the like) to any triggered distribution list as illustrated in FIG. 9. The server system 110 may be configured to provide a map-based graphical display of all monitors 108 associated with a specific account as illustrated in FIG. 7. The server system 110 may be configured to provide graphical and report-based data analysis tools for the user to view and analyze sensor data on the user device 112 as illustrated in FIG. 8. The server system 110 may be may further be configured to provide a control interface to send commands or query status of the traffic controller (ATC) 104 itself, or any other compatible device connected to the monitor 108. The server system 110 may be configured to provide a SCADA interface to allow an external SCADA master or SCADA system 412 to query information and send commands to remote devices, with the server system 110 and the monitors 108 acting as a bridge.

In one aspect, the server system 110 may include a processor 402, a memory 404, a storage device 406, and an input/output device 408. Each of the processor 402, the memory 404, the storage device 406, and the input/output device 408 can, for example, be interconnected using a system bus 410. The processor 402 may be capable of processing instructions for execution within the server system 110. In one implementation, the processor 402 is a single-threaded processor. In another implementation, the processor 402 is a multi-threaded processor. The processor 402 may be configured for processing instructions stored in the memory 404 or on the storage device 406 to provide communications to the monitor 108. The processor 402 may be configured for processing instructions stored in the memory 404 or on the storage device 406 that include a reporting process 600 described below in reference to FIG. 6. In some aspects, a parallel processing set of the server system 110 may be connected over a network may be employed, clustered into one or more server centers.

The user interaction with the server system 110 may be through a standard web browser implemented by the user device 112. Alternatively or complementarily applications or other user interfaces may be employed. In one aspect, the user interaction with the server system 110 may be through an application implemented by the user device 112 when the user device 112 is an Internet enabled device such as a smartphone, wireless device, or the like.

By deploying throughout a region, operations may be managed and analyzed remotely with a standard web browser. Real-time status may be available online, text and alerts provide instant notification of a problem, and historical data allows for long-term and predictive analysis of traffic signal operations.

While this aspect is described as a "server system," those of skill in the art will appreciate that handling, processing, and transforming information from monitors or other sources, as well as provide visualizations, analytics, and control, can be implemented in a variety of manners in varying combinations of hardware and/or software without departing from the scope or spirit of the innovation.

Figure 5:
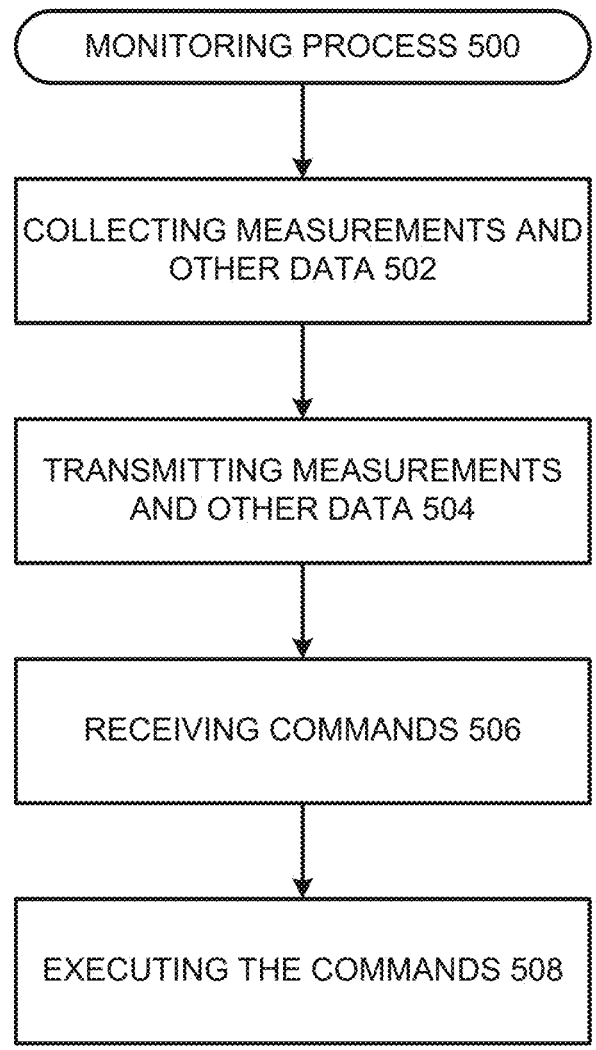
FIG. 5 illustrates an exemplary process according to an aspect of the disclosure.

FIG. 5 illustrates an exemplary process according to an aspect of the disclosure.

In one aspect, the monitor 108 may implement a monitoring process 500. The monitoring process 500 may include collecting measurements and other data 502 of one or more components of the traffic control system 102. The monitoring process 500 may include transmitting measurements and other data 504 of one or more components of the traffic control system 102 to the server system 110. The monitoring process 500 may include receiving commands 506 for one or more components of the traffic control system 102 from the server system 110. The monitoring process 500 may include executing the commands 508 for one or more components of the traffic control system 102.

The monitor 108 may be a small, standalone, optionally weatherproof device with an internal power supply (power supply 312), a data connection (e.g., one or more of a cell modem, satellite modem, or other data connection) implemented as a transceiver 304, antenna, and a microprocessor or the processor 302. In aspects, the monitor 108 may be consolidated in a single housing (housing 306), and in alternative aspects, one or more elements of the monitor 108 may be arranged in another fashion.

The monitor 108 may incorporate an internal AC power supply, designed to be powered from the same AC voltage being measured. In an aspect, this power supply may be rated for 60-300 VAC to ground, or 60-600 VAC, with a CAT III or CAT IV rating. The monitor 108 may use a microprocessor and embedded technology (processor 302) to control the cell and/or satellite modems (transceiver 304), process data from external ports (communication ports 308), interface to and/or include A/D converters, and perform real-time voltage, current, and power calculations received from the sensors 220. As an example, the processor 302 may be implemented as an ST Micro STM32F205 or similar component, running FreeRTOS. Alternatively, a different processor such as the Atmel SAM9G25 running embedded Linux may be used. Other suitable processors and operating systems that provide similar functionality are contemplated as well. In some aspects, the A/D converters may be internal to the microprocessor (processor 302) and may be used for voltage and current sampling.

The transceiver 304 of the monitor 108 may include an embedded cell modem, such as the Telit LE866, and may be used for communication to the server system 110. Other similar embedded modems or wired Ethernet may also be used for the same purpose. In aspects utilizing a single housing aspect of the housing 306, integration of the modem, antenna, and power supply 312 into a very small, weatherproof housing 306 allows for placement in outdoor environments, or embedded into an existing equipment panel or the cabinet 118.

In alternative or complementary aspects, other communication means (wired or wireless) may be used alone or in conjunction with modems or network interfaces to transmit or receive some or all of the communications described herein. An alternative aspect replaces the cell modem with an Ethernet port. This Ethernet port may be used to connect the monitor 108 to a microwave relay or other backhaul connection to the Internet, as an alternative (e.g., for areas with no cell coverage) or complementary means of connectivity. In some aspects, the monitor 108 may be connected via the Ethernet port to an external satellite internet connection.

Measurements from the monitor 108 received from the sensors 220 (e.g., RMS voltage, current, power, temperature, etc.) may be taken once per second or at other reading intervals. The monitor 108 may collect these readings until enough readings are gathered to efficiently compress the data. Collection periods may cover any time interval (e.g., 1 minute, 5 minutes, and shorter or longer periods). When the collection period is reached, the readings may be compressed into a packet and the compressed packet may be sent to an incoming data server and/or the server system 110.

The readings may also be checked against stored thresholds, and if a threshold condition is met, an alert, alarm condition, and/or alarm state may be entered. Upon entering an alarm state, the monitor 108 immediately sends a status update to the server system 110, along with any buffered measurement data. In aspects, an adjustable averaging window may be applied to the periodic data, and thresholds applied to the averaged data instead. Buffered data may also be sent immediately upon request from the server system 110. The monitor 108 may also be placed in a "burst" mode upon command from the server system 110, which may cause the monitor 108 to stream 1-second readings continuously on a periodic basis for a period of time. This allows the display of live measurements in the web application on the user device 112.

In one aspect, the monitor 108 may be configured to collect measurements, apply user settable thresholds, receive external commands, respond to external commands, execute external commands, and the like with respect to the signals 106, the traffic controller (ATC) 104, the traffic control system 102, and the like.

Figure 6:
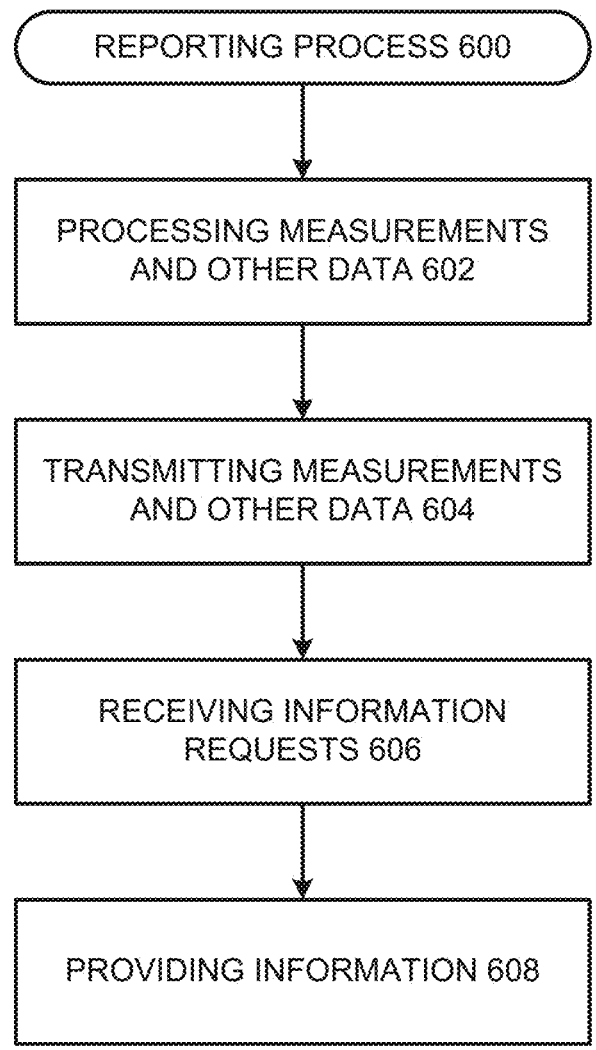
FIG. 6 illustrates an exemplary process according to an aspect of the disclosure.

FIG. 6 illustrates an exemplary process according to an aspect of the disclosure.

In one aspect, the server system 110 may implement a reporting process 600. The reporting process 600 may include processing measurements and other data 602 of one or more components of the traffic control system 102. The reporting process 600 may include transmitting measurements and other data 604 of one or more components of the traffic control system 102 to the user device 112. The reporting process 600 may include receiving information requests 606 for one or more components of the traffic control system 102 from the user device 112. The reporting process 600 may include providing information 608 for one or more components of the traffic control system 102 to the user device 112.

The server system 110 may be hosted by a provider such as Amazon Web Services (Amazon Web Services (AWS), Seattle Wash.). In alternative or complementary aspects, dedicated or managed servers can be used. In one aspect, the server system 110 may include a collection of Berkeley Software Distribution (BSD) or Linux-based virtual machine servers, including a server for receiving and parsing incoming monitor packets from the monitor 108, storing received measurements, processing and sending alert emails and SMS messages, storing device information, user information, account information, billing information, and the traffic controller (ATC) 104/intersection information in a SQL database or the like, and providing web hosting (e.g., with Apache) for the user web application. In aspects, the servers may be connected in a private network, with only the web host including a separate, public network interface (to allow web browser connections). In one aspect, the monitors 108 may be networked inside a cell carrier private network, with a VPN connection to the incoming data collection server.

In one aspect, the server system 110 may include a Domain Name System (DNS) service, a content delivery network, an elastic load balancing system, and an automatic scaling set of deployed Web servers, application servers, and report servers. The Web servers, application servers, and report servers may be deployed in an auto scaling group with one or more elastic load balancers. The application servers may further connect to a series of databases. The series of databases may be implemented as a plurality of relational database service (RDS) database instances. Additionally, there may be additional S3 databases to provide storage accessible over a communication channel by the network.

In one aspect, a data server and/or the server system 110 decompresses data received from the monitors 108 and stores the measurement data. Although the data may be stored in a relational database, an aspect may use a binary file format to store individual packets. A separate combiner process may run in the background, reading the small stored packets and combining them into larger chunks (e.g., into a 24 hour chunk).

A separate background decimation process may read the chunks (e.g., 24 hour files), and any remaining raw packet files, and create decimated files over longer time spans. In aspects, a decimation ratio may be 16:1, 12:1, or 10:1, but other ratios can be used. The decimated data may comprise min/max points over the decimation range. In a non-limiting example, with a 12:1 factor, 12 raw data points may be consolidated into a single pair of min/max points over that time span. Further levels of decimation may be used to sparse datasets of min/max pairs.

When graphical data is requested from user activity in the web application on the user device 112, the server system 110 may select raw, combined, or decimated data at the correct decimation level to minimize data access to produce long graphs. For example, a graph of 1 second data over a month timespan would require 24×60×60×31=over 64 million points per measurement. Graphing multiple parameters over this time period could require over 1 billion data points. Sending this many points through to a web browser for an interactive graph is not practical, and rendering the graph on the server would take prohibitive machine resources. Using decimated data (e.g., 3rd level decimation with 12:1 factor=1728:1) reduces data processing requirements dramatically, and makes near-instant graphing of very large datasets practical in a web application. Data may be pre-decimated with background processes on the server system 110, decimated on the fly from raw packet files, the data may be combined, partially decimated, or the like as data is requested from the web application.

FIG. 7 illustrates an exemplary display according to an aspect of the disclosure.

The web application may be hosted by the server system 110 and may present a map-based display of all monitors 108 in a user's account as illustrated in FIG. 7. The monitors may be located at intersections manually by the user, automatically located by using a location determination device 322 utilizing a global navigation satellite system (GNSS) (e.g., GPS), or other positioning information sent by the monitor 108.

The monitors 108 may be automatically associated with existing intersections by inputting each street address. In one aspect, the status of the traffic controller (ATC) 104 may be indicated on the map using different colors or icons for the monitor—e.g., normal operation, caution/all red/all yellow mode, etc. Predictive calculations such as estimated uninterruptible power source (UPS) 204 battery, signal 106 light lifetime, or the signal 106 light failure may also be indicated graphically through icons or specific coloring. The map may also display overlays for other geographic information system (GIS) information, including traffic information, live camera feeds, weather information, or other imported information. The operator may quickly determine overall intersection status from within this map view on the user device 112.

The web page may be used to request the generation of reports in various formats (HTML, CSV, PDF, etc.) as illustrated in FIG. 8. These reports may be raw measurements from one or more monitors 108, alert history, current intersection status, account billing information, etc. The reports may be rendered immediately and presented to the user in the browser on the user device 112, or configured to be emailed on a scheduled basis to the user device 112.

Distribution lists may be created for email or SMS alerts based on alarm conditions from one or more monitors 108. For example, FIG. 9 illustrates SMS alerts sent to the user device 112. These lists may be created and/or stored in local or remote and personal or shared systems. Separate lists may be used for different sets of alerts. Emails and text message may be text only, or include graphical information such as recent trend data from applicable measurements, to provide context and information about the alert. Notifications may be delayed or suppressed in aspects, so that no alert is sent if the alarm condition clears itself within a specified period of time, or aggregated so that a summary notification is sent instead of multiple separate notifications for a specified time period.

Additionally, the server system 110 may analyze the measurements from the monitor 108 utilizing artificial intelligence in order to more accurately ascertain an alert condition. The artificial intelligence as described herein may utilize any number of approaches including one or more of cybernetics and brain simulation, symbolic, cognitive simulation, logic-based, anti-logic, knowledge-based, sub-symbolic, embodied intelligence, computational intelligence and soft computing, machine learning and statistics, and the like.

The server system 110 may present an external interface, to allow a connection to a 3rd party SCADA system 412 or other control system. The external interface may use a standard SCADA protocol such as DNP or MODBUS over IP, and presents device slave addresses and point maps such that the external SCADA system 412 may poll or send commands to the server system 110. The server system 110 parses SCADA messages, responding as needed. These commands and queries may be for data stored on the server system 110, or require the server system 110 to issue commands to various monitors 108. For example, an operator may send a SCADA command to operate the traffic controller (ATC) 104, the signals 106, the monitor 108, or the like from an outside system. This command may be received by the server system 110, processed, and relayed to the applicable monitor 108 that is connected to the desired the traffic controller (ATC) 104, the signals 106, or the like. The monitor 108 passes the command to the traffic controller (ATC) 104, the signals 106, or the like, and returns any response back to the server system 110, which in turn responds to the outside system.

An aspect may use JavaScript (or another language) executing in the user's local web browser to query the server system 110 for active monitors 108, status, and other information needed to render the map-based display and any alerts or icon information. The browser JavaScript may periodically poll the server system 110 for changes in the traffic controller (ATC) 104, the signals 106, the monitor 108, or the like status (e.g., every 5 seconds), so any change in state is reflected on the live map. The web application may present a user interface on the user device 112 to allow the user to select one or more of the traffic controller (ATC) 104, the signals 106, the monitor 108, or the like, so that their data may be viewed graphically. Asynchronous JavaScript and XML (AJAX) requests from the JavaScript code may be generated that request measurement data from the server system 110 as needed. These requests may include monitor ID, timestamp, measurements needed, current viewport size, session information, and the like so that the server system 110 may collect and possibly send decimated data back to the requesting code. The server-side code for handling requests may be written in PHP, C, C++, or the like.

Location Awareness

In alternative and complementary aspects, the system disclosed herein may be augmented with additional features. For example, the monitor 108 may include a location determination device 322 utilizing a global navigation satellite system (GNSS) that may be implemented with a GPS module to determine location. The monitor 108 position may be sent to the server system 110 so that the monitor 108 may be located automatically on the displayed map. The server system 110 may also use the monitor 108 position information to automatically associate it with a known traffic controller (ATC) 104 or road intersection, stored in the server database, a lookup in public records, or the like. If the monitor 108 is moved to a different location, the server system 110 may automatically detect this change, adjust the displayed monitor 108 location, and associate the monitor 108 and new incoming data with the new intersection. Graphs and reports from received data may be grouped and analyzed by area in addition to by specific monitor ID.

Existing SCADA Interface

In further alternative and complementary aspects, the monitor 108 may be augmented to interface directly with the sensors 220, traffic controllers (ATC) 104, MMUs (Malfunction Management Unit), and/or the like existing, or installed afterwards. With the addition of a MODBUS, DNP3, or other standard protocols via RS-485, RS-232, or Ethernet, the monitor 108 may poll other devices on a periodic basis to gather measurements or status information from these external devices. This data may be collected and processed in a similar fashion to the native voltage and current measurements.

In addition to using a communications port for interfacing to the sensors 220, the monitor 108 may allow control and query commands to be transferred from the server, through the monitor, to external equipment.

The monitor 108 may provide routing between a local Ethernet port or ports, and its internal cell or LAN connection. This routing may include security such as a VPN or encrypted link, allowing remote software to communicate with devices connected locally to the monitor, such as an ATC.

Maintenance Analysis

In some aspects, the monitor 108 monitors the supply side of the AC current supplied to the ATC, the traffic controller (ATC) 104, and/or other components. In alternative or complementary aspects, a Rogowski coil, iron-core CT transducers, or the like may be connected to a multi-channel current input port on the monitor 108. In other aspects, series resistors may be used to sense current. These transducers, along with the AC voltage inputs, allow the monitor 108 to monitor RMS voltage supplied to the ATC by the electric utility, and the RMS current drawn by the ATC. These RMS readings may be computed at intervals (e.g., once per second). In another aspect, the raw voltage and current waveforms may be used to compute power quality metrics such as total harmonic distortion, voltage sags, voltage and current unbalance, harmonic and interharmonic levels, and the like. These readings may be sent to the server system 110 on a periodic basis, and used in a manner similar to the standard measurements. Metrics such as voltage to current unbalance ratio, voltage notching, harmonic levels, and other measures may be computed and used to predict impending ATC failure. These predictions may be computed by the monitor 108, or in an aspect, by the server system 110. Baseline values and voltage/current waveform parametric pairs may be stored in the server system 110 and used to compare with recent readings to help determine ATC and signal status, or the need for preventative maintenance.

Because the ATC's current includes the summation of all light signal currents, it may be analyzed and compared with baseline readings to determine light signal health. For example, a red signal composed of dual LED arrays may consume a nominal amount of current or power. If one LED array fails, the consumed power will be reduced. This reduction may be detected by the monitor 108 or server system 110, generating an alert warning of a failed LED array. Analytics may also be performed for other types of LED or light arrays. Each color may be tracked separately, based on different baseline power consumptions, or by identifying known light timing patterns. Light health computed from on-time, number of switching events, ambient temperature, etc. may be performed by the server and delivered as reports, or predictive/preventative maintenance recommendations.

Signal Monitoring

In some aspects, with the addition of auxiliary voltage and current inputs, the monitor 108 may measure and process signal voltages and current consumption directly. Voltage inputs may be 120 VAC nominal, or DC (e.g., 12 VDC or 24 VDC), as provided by the ATC. Signal current consumption may also be monitored. These measurements may be processed in a fashion similar to the AC voltage and current-processed in real time for threshold exceedances, and accumulated and compressed for transmission to the server system 110.

ATC Signal Analysis

In some aspects, server logic may be applied to analyze current consumption from the monitor 108 to identify the specific signaling patterns programmed into the connected ATC. By analyzing the timing, RMS current, and possibly more specific waveform details, identification of red, yellow, green, and walk times may be performed. The resulting pattern may be compared to standard templates, and any mismatch between actual ATC output and the desired output may be flagged on the map-based display, through email/SMS alerts, and reports. In particular, automatic identification of emergency modes that may be entered upon power failure/uninterruptible power source (UPS) 204 switchover, emergency vehicle override, or other situations may be detected.

Accordingly, the disclosure has set forth a server system 110 and/or monitor 108 that provides a system-wide AC power monitoring, traffic control status monitoring, communications access to the controller, and the like to improve reliability, maintenance operations, and the like for traffic systems.

The many features and advantages of the disclosure are apparent from these papers, and, thus, it is intended to cover all such features and advantages of the disclosure which fall within the true spirit and scope of the disclosure. Further, since numerous modifications and variations will readily occur to those skilled in the art on study of these disclosures, it is not desired to limit the disclosure to the exact construction and operation illustrated and described, and, accordingly, all suitable modifications and equivalents may be resorted to that fall within the scope of the disclosure.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum The disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an aspect, the disclosure may be web-based. For example, a server may operate a web application to allow the disclosure to operate in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™' Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The term text message or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, 5G networks or networks associated with the communication channel as defined herein. In other aspects, text message may include Multimedia Messaging Service (MMS), which is a standard way to send messages that include multimedia content to and from mobile phones. It extends the core SMS (Short Message Service) capability that allowed exchange of text messages only up to 160 characters in length. MMS can be used within the context of the present disclosure for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The term data as utilized herein includes mobile broadband or wireless Internet access delivered through mobile phone towers over a communication channel as defined herein to computers, mobile phones, wireless devices, and other digital devices as defined herein using portable modems. Some mobile services allow more than one device to be connected to the Internet using a single cellular connection using a process called tethering.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

In this specification and claims, it is to be understood that reference to a smartphone or wireless device may be implemented as mobile phone, tablet computer, MP3 player, personal computer, PDA, and the like. A "smartphone" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, or other mobile computing devices that may be supported by a wireless network.

The application described in the disclosure may be implemented to execute on a processor. The processor also executing an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A system configured to provide an interface between a user device and a traffic control system comprising:
   a monitor configured to collect sensor data from at least one sensor implemented in one or more components of a traffic control system, the sensor data comprising at least a status of the traffic control system and electrical measurement data;
   the monitor is further configured to transmit over a network to a server at least the status of the traffic control system and the electrical measurement data;
   the server configured to receive over the network at least the status and the electrical measurement data from the traffic control system, wherein the traffic control system includes a traffic controller and traffic signals located in proximity to an intersection;
   the server further configured to analyze at least the status and the electrical measurement data from the traffic control system;
   the server further configured to transmit over a network to a user device an analysis of at least the status and the electrical measurement data from the traffic control system;
   the monitor is further configured for direct measurement of a received utility single or three-phase voltage, current, and power; and
   the monitor is further configured to package the sensor data from the at least one sensor implemented in the one or more components of the traffic control system and the direct measurement of the received utility single or three-phase voltage, current, and power for streaming to the server,
   wherein the traffic signals comprise at least one of the following: traffic lights, traffic signals, traffic lamps, signal lights, stop lights, pedestrian crossing lights, and cyclist crossing lights; and
   wherein the at least one sensor comprises at least one of the following: a voltage sensor measuring a voltage in the traffic control system, a current sensor measuring a current in the traffic control system, a power measurement sensor measuring a power in the traffic control system, and a temperature sensor measuring a temperature in the traffic control system.

2. The system configured to provide an interface between a user device and a traffic control system according to claim 1 wherein:
   the monitor comprises a transceiver and a processor;
   the monitor is configured check the sensor data against stored thresholds; and
   the monitor is configured to enter an alert state, alarm condition, and/or alarm state when the sensor data exceeds at least one of the stored thresholds.

3. The system configured to provide an interface between a user device and a traffic control system according to claim 1 wherein:
   the server is further configured to transmit map-based information over the network to the user device that graphically illustrates the analysis of at least the status and the electrical measurement data from the traffic control system and geographic information system (GIS) information comprising at least one of the following: traffic information, live camera feeds, and weather information; and
   the user device is configured to exchange data with the server, provide information to the server, provide control to the server, provide commands to the server, obtain the status from the server, and obtain the electrical measurement data from the server.

4. The system configured to provide an interface between a user device and a traffic control system according to claim 1 wherein:
   the server is further configured to transmit an information report over a network to the user device that provides analysis of at least the status and the electrical measurement data from the traffic control system; and
   the status from the traffic control system comprises failure of lamps or LED assemblies of the traffic signals.

5. The system configured to provide an interface between a user device and a traffic control system according to claim 1 wherein:

the server is further configured to receive over a network the sensor data from the traffic control system, information from the traffic control system, the electrical measurement data from the traffic control system, and the status from the traffic control system; and the server is further configured to predict device failure based on at least one of the following: the sensor data, the information, the electrical measurement data, and the status.

6. The system configured to provide an interface between a user device and a traffic control system according to claim 1 further comprising:
a plurality of the monitors, each of the plurality of monitors configured to collect sensor data from at least one sensor implemented in one or more components of a respective one of a plurality of traffic control systems;
wherein the server is configured to receive and parse the sensor data from each of the plurality of monitors;
wherein the server is configured to store the sensor data from each of the plurality of monitors;
wherein the server is configured to process alerts from each of the plurality of monitors; and
wherein the server is configured to provide graphical and report-based data analysis tools to the user device.

7. The system configured to provide an interface between a user device and a traffic control system according to claim 1:
wherein the monitor is configured to collect data from the traffic control system, information from the traffic control system, the electrical measurement data from the traffic control system, and the status from the traffic control system;
wherein the monitor is further configured to transmit over the network to the server the data from the traffic control system, the information from the traffic control system, the electrical measurement data from the traffic control system, and the status from the traffic control system; and
wherein the monitor comprises a transceiver and a processor.

8. The system configured to provide an interface between a user device and a traffic control system according to claim 1 wherein:
the server further configured to analyze data from the traffic control system, information from the traffic control system, the electrical measurement data from the traffic control system, and the status from the traffic control system;
the server further configured to transmit over a network to the user device an analysis of the data from the traffic control system, the information from the traffic control system, the electrical measurement data from the traffic control system, and the status from the traffic control system; and
the server further configured to interact with the user device through at least one of the following: a standard web browser implemented by the user device and an application implemented by the user device.

9. The system configured to provide an interface between a user device and a traffic control system according to claim 1 wherein:
the monitor is configured to apply thresholds to the direct measurement of the received utility single or three-phase voltage, current, and power and/or the sensor data from the at least one sensor implemented in the one or more components of the traffic control system and send alerts to the server.

10. A process to provide an interface between a user device and a traffic control system comprising:
collecting with a monitor sensor data from at least one sensor implemented in one or more components of a traffic control system, the sensor data comprising at least a status of the traffic control system and electrical measurement data;
transmitting over a network with the monitor to a server at least the status and the electrical measurement data from the traffic control system;
receiving over the network with the server at least the status and the electrical measurement data from the traffic control system, wherein the traffic control system includes a traffic controller and traffic signals located in proximity to an intersection;
analyzing with the server at least the status and the electrical measurement data from the traffic control system; and
transmitting with the server over a network to a user device an analysis of at least the status and the electrical measurement data from the traffic control system,
wherein the monitor is configured for direct measurement of a received utility single or three-phase voltage, current, and power,
wherein the monitor is further configured to package the sensor data from the at least one sensor implemented in the one or more components of the traffic control system and the direct measurement of the received utility single or three-phase voltage, current, and power for streaming to the server,
wherein the at least one sensor comprises at least one of the following: a voltage sensor measuring a voltage in the traffic control system, a current sensor measuring a current in the traffic control system, a power measurement sensor measuring a power in the traffic control system, and a temperature sensor measuring a temperature in the traffic control system, and
wherein the traffic signals comprise at least one of the following: traffic lights, traffic signals, traffic lamps, signal lights, stop lights, pedestrian crossing lights, and cyclist crossing lights.

11. The process to provide an interface between a user device and a traffic control system according to claim 10 wherein:
the monitor comprises a transceiver and a processor;
the monitor is configured check the sensor data against stored thresholds; and
the monitor is configured to enter an alert state, alarm condition, and/or alarm state when the sensor data exceeds at least one of the stored thresholds.

12. The process to provide an interface between a user device and a traffic control system according to claim 10 wherein:
the server is further configured to transmit map-based information over the network to the user device that graphically illustrates the analysis of at least the status and the electrical measurement data from the traffic control system and geographic information system (GIS) information comprising at least one of the following: traffic information, live camera feeds, and weather information; and
the user device is configured to exchange data with the server, provide information to the server, provide control to the server, provide commands to the server, obtain the status from the server, and obtain the electrical measurement data from the server.

13. The process to provide an interface between a user device and a traffic control system according to claim 10 wherein:
the server is further configured to transmit an information report over a network to the user device that provides analysis of at least the status and the electrical measurement data from the traffic control system; and
the status from the traffic control system comprises failure of lamps or LED assemblies of the traffic signals.

14. The process to provide an interface between a user device and a traffic control system according to claim 10 wherein:
the server is further configured to receive over a network the sensor data from the traffic control system, information from the traffic control system, the electrical measurement data from the traffic control system, and the status from the traffic control system; and
the server is further configured to predict device failure based on at least one of the following: the sensor data, the information, the electrical measurement data, and the status.

15. The process to provide an interface between a user device and a traffic control system according to claim 10 further comprising:
implementing a plurality of the monitors, each of the plurality of monitors configured to collect sensor data from at least one sensor implemented in one or more components of a respective one of a plurality of traffic control systems, wherein the server is configured to receive and parse the sensor data from each of the plurality of monitors;
wherein the server is configured to store the sensor data from each of the plurality of monitors;
wherein the server is configured to process alerts from each of the plurality of monitors; and
wherein the server is configured to provide graphical and report-based data analysis tools to the user device.

16. The process to provide an interface between a user device and a traffic control system according to claim 10:
wherein the monitor is further configured to transmit over the network to the server the sensor data from the traffic control system, information from the traffic control system, and the status and the electrical measurement data from the traffic control system;
wherein the monitor comprises a transceiver and a processor; and
wherein the server further configured to interact with the user device through at least one of the following: a standard web browser implemented by the user device and an application implemented by the user device.

17. The process to provide an interface between a user device and a traffic control system according to claim 10 wherein:
the monitor is configured to apply thresholds to the direct measurement of the received utility single or three-phase voltage, current, and power and/or the sensor data from the at least one sensor implemented in the one or more components of the traffic control system and send alerts to the server.

* * * * *